United States Patent
Sundararaman et al.

(10) Patent No.: US 11,921,904 B1
(45) Date of Patent: Mar. 5, 2024

(54) SYSTEM AND METHODS FOR FIRMWARE SECURITY MECHANISM

(71) Applicant: Marvell Asia Pte, Ltd., Singapore (SG)

(72) Inventors: Ramacharan Sundararaman, San Jose, CA (US); Nithyananda Miyar, San Jose, CA (US); Martin Kovac, Newmarket (CA)

(73) Assignee: Marvell Asia Pte Ltd, Singapore (SG)

( * ) Notice: Subject to any disclaimer, the term of this patent is extended or adjusted under 35 U.S.C. 154(b) by 714 days.

(21) Appl. No.: 16/947,424

(22) Filed: Jul. 31, 2020

Related U.S. Application Data

(60) Provisional application No. 63/007,225, filed on Apr. 8, 2020.

(51) Int. Cl.
  *G06F 21/71* (2013.01)
  *G06F 8/65* (2018.01)

(52) U.S. Cl.
  CPC ............... *G06F 21/71* (2013.01); *G06F 8/65* (2013.01)

(58) Field of Classification Search
  CPC ...... G06F 21/57; G06F 21/577; G06F 21/575; G06F 21/572; G06F 21/71; G06F 21/70; G06F 21/74
  See application file for complete search history.

(56) References Cited

U.S. PATENT DOCUMENTS

| | | | | |
|---|---|---|---|---|
| 7,209,918 B2 * | 4/2007 | Li | ............ | G06F 9/52 |
| 8,127,413 B2 * | 3/2012 | Pu | ............ | G06F 21/577 |
| | | | | 26/25 |
| 9,177,153 B1 * | 11/2015 | Perrig | ............ | G06F 21/57 |
| 10,628,579 B2 * | 4/2020 | Boivie | ............ | G06F 21/53 |
| 2008/0016410 A1 * | 1/2008 | Pu | ............ | G06F 21/64 |
| | | | | 714/47.2 |
| 2012/0023553 A1 * | 1/2012 | Berg | ............ | G06F 21/577 |
| | | | | 726/4 |
| 2012/0167106 A1 * | 6/2012 | Shpeisman | ............ | G06F 9/52 |
| | | | | 718/102 |
| 2015/0373046 A1 * | 12/2015 | Sapello | ............ | H04L 63/145 |
| | | | | 726/23 |
| 2016/0072796 A1 * | 3/2016 | Adam | ............ | H04L 63/0853 |
| | | | | 713/159 |
| 2018/0349603 A1 * | 12/2018 | Yamada | ............ | G06F 21/554 |

(Continued)

FOREIGN PATENT DOCUMENTS

| | | | | |
|---|---|---|---|---|
| CN | 110730159 B | * | 1/2022 | ............ G06F 21/57 |
| WO | WO-2018026841 A1 | * | 2/2018 | ............ G06F 15/16 |
| WO | WO-2019115993 A1 | * | 6/2019 | ......... G06F 12/0868 |

*Primary Examiner* — Tae K Kim

(57) ABSTRACT

A new approach is proposed to support a hardware-based lock mechanism having a hardware-based lock unit associated with a resource, wherein the lock is utilized by an arbitrator to arbitrate between multiple agents requesting access to the resource. When a first agent requests access to resource in unlocked state, the arbitrator creates a lock ID and set a locked state indicating that the resource is locked. The lock ID is provided to the first agent, which now has exclusive control over the resource. The arbitrator ensures that any agent with the same ID may access the resource. When a second agent requests access to the resource with a lock ID to the arbitrator, it is granted access to the resource if the lock ID provided matches the one stored on the lock unit. If there is a mismatch between the lock IDs, access to the resource is denied.

30 Claims, 2 Drawing Sheets

(56) References Cited

U.S. PATENT DOCUMENTS

| | | | |
|---|---|---|---|
| 2019/0306282 A1* | 10/2019 | Masputra | G06F 9/4881 |
| 2020/0143043 A1* | 5/2020 | Hong | G06F 21/566 |
| 2020/0264988 A1* | 8/2020 | Branco | G06F 21/52 |
| 2021/0240489 A1* | 8/2021 | Xie | G06F 21/572 |

* cited by examiner

SYSTEM AND METHODS FOR FIRMWARE SECURITY MECHANISM

CROSS-REFERENCE TO RELATED APPLICATIONS

This application claims the benefit of U.S. Provisional Patent Application No. 63/007,225, filed Apr. 8, 2020, which is incorporated herein in its entirety by reference.

BACKGROUND

Device security is becoming more and more important given the prevalence use and the personal nature of electronic devices. Any gap in security of an electronic device (e.g., between time of check and time of use) may expose the electronic device to a malicious attack. In some cases, a gap exists between the time of check (TOC) and the time of use (TOU) and a potential TOC/TOU attack may occur after a firmware for the electronic device has been authenticated at some point in time and before it is later being used by the electronic device. In some cases, the firmware that is stored in a nonvolatile memory (e.g., a ROM, a flash device) of the electronic device may be accessed and updated by multiple agents, e.g., ARM CPU cores, Power Management Controller (PMC) etc. Although a sideband firmware can be used to make changes and to repair the accessed/damaged firmware of the electronic device, the sideband firmware itself can also be accessed and utilized by an attacker to expose the electronic device to attacks.

Currently, password protection is often adopted to prevent unauthorized access to the firmware of electronic device. While password protection may provide some level of firmware protection and security, it is a weak protection and can be compromised. In general, software-enforced security mechanism is weak because an external attacker can compromise the software and expose the electronic device externally. For a non-limiting example, a flash memory can have password-based protection, but it is subject to comprise and is thus not secure.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
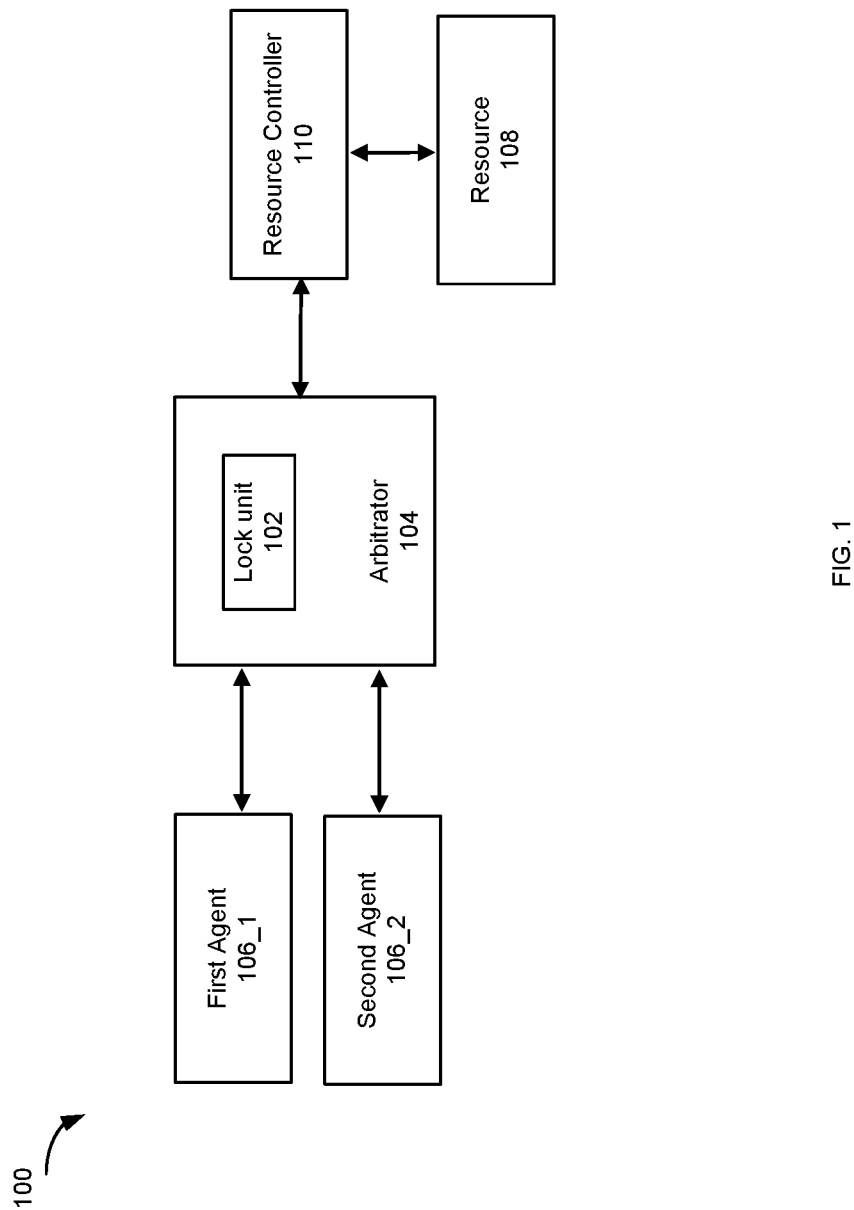
FIG. 1 depicts an example of a diagram of a hardware-based lock mechanism configured to support firmware security according to one aspect of the present embodiments.

The following disclosure provides many different embodiments, or examples, for implementing different features of the subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Before various embodiments are described in greater detail, it should be understood that the embodiments are not limiting, as elements in such embodiments may vary. It should likewise be understood that a particular embodiment described and/or illustrated herein has elements which may be readily separated from the particular embodiment and optionally combined with any of several other embodiments or substituted for elements in any of several other embodiments described herein. It should also be understood that the terminology used herein is for the purpose of describing the certain concepts, and the terminology is not intended to be limiting. Unless defined otherwise, all technical and scientific terms used herein have the same meaning as commonly understood in the art to which the embodiments pertain.

A new approach is proposed that contemplates systems and methods to support a hardware-based lock mechanism having a hardware-based lock unit associated with a resource (e.g., a nonvolatile memory or a bus), wherein the hardware-based lock unit is utilized by an arbitrator to arbitrate between multiple agents/components requesting access to the resource. Here, the hardware-based lock mechanism has a state associated with it. When a first agent/component requests access to the resource and if the resource is in an unlocked state, the arbitrator is configured to create a lock identification/ID and set a locked state (e.g., a bit of the hardware-based lock unit), indicating that the resource is locked. The lock ID is then provided to the first agent, which now has exclusive control over the resource. The arbitrator ensures that any agent/component with the same ID is provided access to the resource. When a second agent later requests access to the resource, the agent is configured to provide the lock ID to the arbitrator. If the resource is in a locked state and lock ID provided matches the one stored on the hardware-based lock unit, the agent is then granted access to the resource. If there is a mismatch between the lock ID provided and the one stored on the hardware lock, the arbitrator is configured to deny access by the second agent to the resource, thus preventing the resource from being accessed by other agents/components.

By utilizing an arbitrator to control access to a locked resource, the proposed hardware-based lock mechanism ensures that only an agent/component having the same lock ID can have access and/or control over the locked resource while other agent/component having a different lock ID will be denied access to the resource to prevent TOC/TOU attacks. Furthermore, the proposed mechanism enables a firmware of an electronic device to be updated by an agent without utilizing a specialized firmware update assist. In fact, a new firmware can be installed and/or updated on the electronic device even by the agent when there is no firmware previously running on the device. For a non-limiting example, if no firmware image is available on a brick device, the device is unlocked for access and a sideband firmware can make a firmware update to the device. Additionally, since the lock mechanism is hardware enforced, the security of the firmware on the resource cannot be easily compromised.

Although a firmware stored in a non-volatile memory is used as a non-limiting example of a resource in the embodiments described below, it is appreciated that the same or similar approach/mechanism is equally applicable to other types of resources and/or components to strengthen their securities.

FIG. 1 depicts an example of a diagram of a hardware-based lock mechanism 100 configured to support firmware security. Although the diagrams depict components as functionally separate, such depiction is merely for illustrative purposes. It will be apparent that the components portrayed in this figure can be arbitrarily combined or divided into separate software, firmware and/or hardware components. Furthermore, it will also be apparent that such components, regardless of how they are combined or divided, can execute on the same host or multiple hosts, and wherein the multiple hosts can be connected by one or more networks.

In the example of FIG. 1, the hardware-based lock mechanism 100 includes a hardware-based lock unit 102, an arbitrator unit 104, one or more agents/components 106s, and one or more resources 108s. Each of these components in the hardware-based lock mechanism 100 is a dedicated hardware block/component or a software running on such hardware block/component. In some embodiments, one or more of these components are programmable by a user at a host (not shown) via software instructions for various operations. When the software instructions are executed, the one or more hardware components becomes a special purposed hardware component for practicing certain machine learning functions.

In the example of FIG. 1, each of the one or more agents 106s is a hardware component or a software component running on a hardware. For a non-limiting example, one of the one or more agents 106s can be a software component, e.g., a sideband firmware configured to make changes to and/or repair or update a firmware image of an electronic device. For another non-limiting example, one of the one or more agents 106s can be a hardware component, e.g., a component of a processor/processing core such as an ARM core. In the example of FIG. 1, each of the one or more resources 108s can be but is not limited to a nonvolatile storage device such as a flash device that stores and maintains certain data or software (e.g., a firmware image) to be accessed by the agents 106s.

In the example of FIG. 1, the one or more agents 106s are each configured to request access to one of the one or more resources 108s during operation. In some embodiments, the one or more agents 106s are configured to access the one of the one or more resources 108s via a resource controller 110, which for a non-limiting example, can be a Serial Peripheral Interface (SPI) controller, wherein the resource controller 110 is configured to control access to one of the one or more resources 108s by the one or more agents/components 106s based on specified and identified SPI slots/addresses of the resources. Here, SPI is an interface bus commonly used to send data between the agents 106s and the resources 108s. In some embodiments, the SPI controller utilizes separate clock and data lines, along with a select line to choose the resource 108 to control access to. For a non-limiting example, the resource controller 110 can be a SPI flash access controller configured to control access to a flash device/drive (a non-limiting example of a resource 108) by the agents 106s as discussed in details below.

In some embodiments, one of the agents 106_1 requesting access to a resource 108, e.g., a flash device, is a component on a processing core, e.g., a Trusted/Secure Boot ROM (TBR) executing on a processing (e.g., ARM) core, wherein the TBR 106_1 is configured to access and verify a firmware image, e.g., a secondary boot image, stored on the flash device. When being executed by a secondary boot loader (SSBL) (which location is determined by the TBR 106_1), the secondary boot image reboots an electronic device. In some embodiments, the TBR 106_1 running on the ARM core is configured to set up its data and go through a hard-coded interface (e.g., PCIe PHY) initialization sequence up on startup. After this startup sequence is complete, the TBR 106_! is configured to determine the SPI slot/address of the flash device to be accessed for the secondary boot image.

Once the TBR 106_1 determines which SPI slot to access the resource 108 (e.g., the flash device), the TBR 106_1 is configured to acquire an exclusive lock of the resource 108 from the arbitrator 104. If the resource 108 is in an unlocked state, i.e., not accessed by another agent, the arbitrator 104 is configured to create a lock identification/ID and set a locked state (e.g., a bit of the hardware lock unit 102), indicating that the resource 108 is now locked. The lock ID is then saved in the hardware lock unit 102 and provided to the TBR 106_1, which is the first agent. The TBR 106_1 now has exclusive access to the secondary boot image stored in the flash device via the SPI controller 110 to reboot the electronic device. Note that as the holder of the exclusive lock to the flash device, the TBR 106_1 has full read and write access to the entire flash device. In some embodiments, once the exclusive lock to the flash device has been acquired, the TBR 106_1 is configured to update a firmware (e.g., the secondary boot image) stored in the flash device before releasing the lock. In some embodiments, the TBR 106_1 is configured to change the lock ID and update the lock unit 102 accordingly while the TBR 106_1 is in possession of the exclusive lock in order to allow or deny another agent 106_2 (e.g., sideband firmware) from accessing the flash drive.

In some embodiments, after acquiring the exclusive lock to access the flash device, the TBR 106_1 is configured to check a signature of the reboot image stored in the flash device and then transfers control to the reboot image in the flash device if the signature is verified. If the firmware image in the SPI flash fails to boot correctly, watchdog timer fires and the reset clears the lock and the boot process starts all over again. In some embodiments, if there is no valid firmware image available on the flash drive under the so-called brick device scenario, the TBR 106_1 is configured to check and attempt to boot from any of the possible SPI slots/addresses after acquiring exclusive lock to access the flash drive. Upon failure to boot images from any of the SPI slots, the TBR 106_1 is configured to release the exclusive lock so that another agent 106_2 (e.g., the sideband firmware) can lock the resource and update the firmware in the flash device.

In some embodiments, the hardware-based locking mechanism provides a mutually exclusive locking scheme to the resource 108 when more than one agent 106 attempt to access the same resource 108. Specifically, when another/second agent 106_2 (e.g., a sideband firmware) later requests access to the same resource 108, the second agent 106_2 is configured to provide a lock ID to the arbitrator 104. If the resource 108 is in a locked state (has been locked by the first agent 106_1) and the lock ID provided by the second agent 106_2 matches the lock ID set for the resource 108, the second agent 106_2 is then granted access to the resource 108 by the arbitrator 104. If there is a mismatch between the lock ID provided by the second agent 106_2 and the lock ID set for the resource 108 and maintained in the hardware-based lock unit 102, the second agent 106_2 is denied access to the resource 108, thus preventing the resource from being accessed by another agent/component. As such, the mutually exclusive locking scheme between the access paths of different agents 106s (e.g., the first agent/TBR 106_1 and the second agent/sideband firmware 106_2)

prevents concurrent access to the resource 108 by a sideband firmware, which could potentially be utilized by an attacker to launch a TOC/TOU attack by modifying the firmware image in the flash device through a sideband channel. In some embodiments, under the race to lock scenario where both agents 106s are racing to the access the resource 108, the arbitrator 104 is configured to enable the first agent 106_1 (e.g., TBR of the ARM core) to lock the resource 108 first before the second agent 106_2 (e.g., the sideband firmware) does during cold booting as the TBR of the ARM core may act much faster than the sideband firmware under the hardware-based locking mechanism.

In some embodiments, the exclusive lock on the resource 108 can only be released by the agent 106 that has acquired the exclusive lock on the resource 108. Specifically in the non-limiting example discussed above, once the first agent 106_1/TBR has taken the exclusive lock on flash device to be accessed by via the SPI controller, the lock on the flash device can only be released by the first agent 106_1 that has acquired the lock on the flash drive first and no other agent 106 (e.g., the second agent 106_2/the sideband firmware) can acquire a lock on the same resource 108 until the exclusive lock on the resource 108 has been explicitly released by the first agent 106_1. Once the first agent 106_1 releases the exclusive lock on the resource 108, it is configured to notify the arbitrator 104 accordingly. Upon receiving the lock releasing notification from the first agent 106_1, the arbitrator 104 is configured to clear the locked state of the hardware-based lock unit 102 by, e.g., reset a corresponding bit of the hardware-based lock unit 102.

In some embodiments, the second agent 106_2 which intends to acquire access to a resource 108 that is currently locked by the first agent 106_1 has to wait until the lock is released by the first agent 106_1. In some embodiments, the second agent 106_2 is configured to check the locked state of the hardware lock unit 102 maintained by the arbitrator 104 either periodically or as needed. In some embodiments, the arbitrator 104 is configured to notify the second agent 106_2 and/or other agents that are waiting for the same resource 108 once the first agent 106_1 releases the exclusive lock on the resource 108 and the lock status has been reset. The second and/or the other agents waiting to access the resource 108 can then acquire a new lock at the resource 108. In some embodiments, the arbitrator 104 is configured to create a new lock ID upon granting the second and/or the other agents a new lock to access the resource while discarding the lock IDs previously used by other agents (e.g., the first agent 106_1) to lock the resource 108. This prevents an attacker from utilizing a previously used lock ID to gain unauthorized access to the resource 108.

Figure 2:
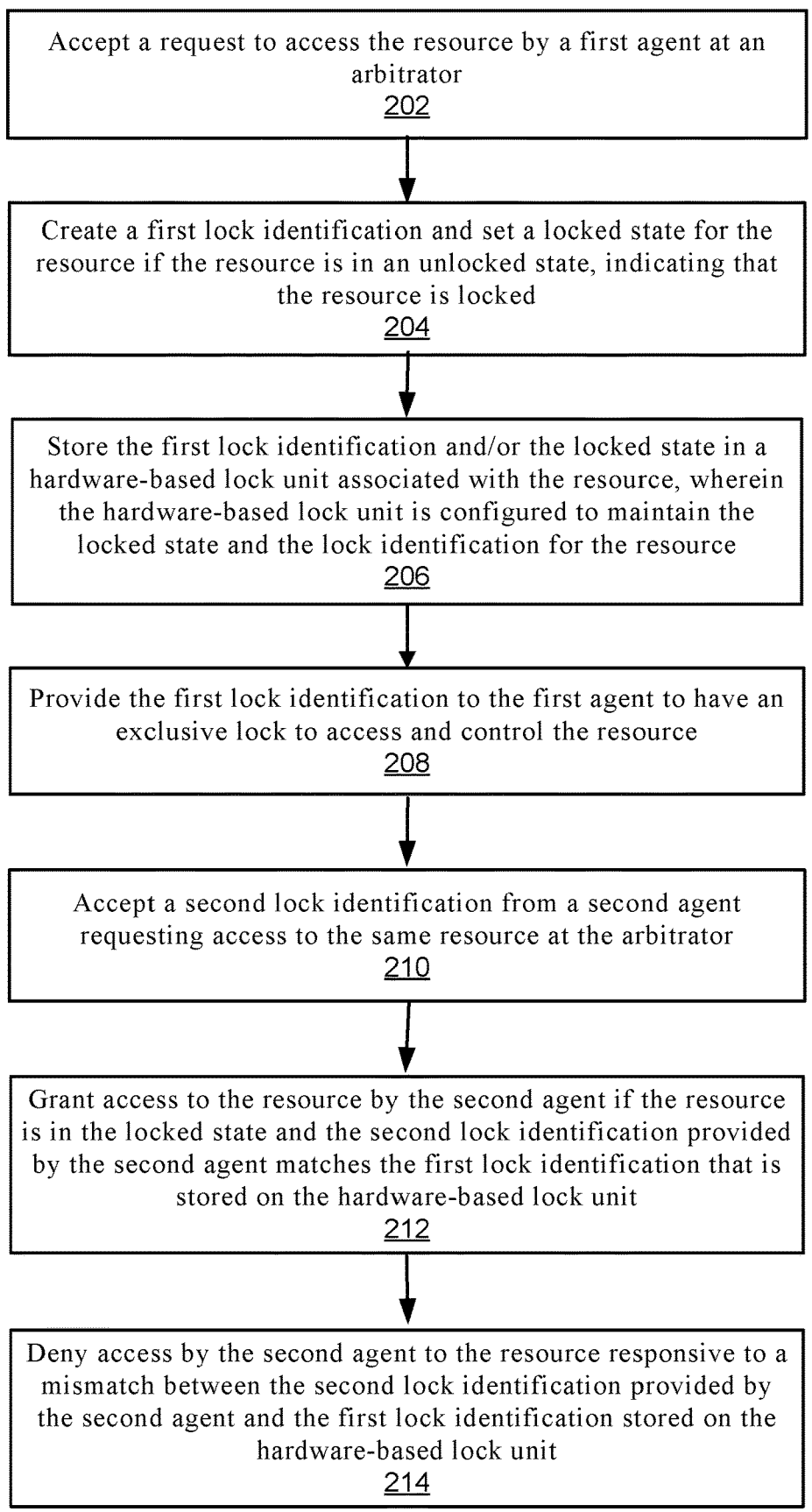
FIG. 2 depicts a flowchart of an example of a process to support firmware security via a hardware-based lock mechanism according to one aspect of the present embodiments.

FIG. 2 depicts a flowchart 200 of an example of a process to support firmware security via a hardware-based lock mechanism. Although the figure depicts functional steps in a particular order for purposes of illustration, the processes are not limited to any particular order or arrangement of steps. One skilled in the relevant art will appreciate that the various steps portrayed in this figure could be omitted, rearranged, combined and/or adapted in various ways.

In the example of FIG. 2, the flowchart 200 starts at block 202, where a request to access the resource by a first agent is accepted at an arbitrator. The flowchart 200 continues to block 204, where a first lock identification is created and a locked state is set for the resource if the resource is in an unlocked state, indicating that the resource is locked. The flowchart 200 continues to block 206, where the first lock identification and/or the locked state are stored in the hardware-based lock unit associated with the resource, wherein the hardware-based lock unit is configured to maintain the locked state and the lock identification for the resource. The flowchart 200 continues to block 208, where the first lock identification is provided to the first agent to have an exclusive lock to access and control the resource. The flowchart 200 continues to block 210, where a second lock identification from a second agent requesting access to the same resource is accepted at the arbitrator. The flowchart 200 continues to block 212, where access to the resource by the second agent is granted if the resource is in the locked state and the second lock identification provided by the second agent matches the first lock identification that is stored on the hardware-based lock unit. The flowchart 200 ends at block 214, where access by the second agent to the resource is denied responsive to a mismatch between the second lock identification provided by the second agent and the first lock identification stored on the hardware-based lock unit.

The foregoing description of various embodiments of the claimed subject matter has been provided for the purposes of illustration and description. It is not intended to be exhaustive or to limit the claimed subject matter to the precise forms disclosed. Many modifications and variations will be apparent to the practitioner skilled in the art. Embodiments were chosen and described in order to best describe the principles of the invention and its practical application, thereby enabling others skilled in the relevant art to understand the claimed subject matter, the various embodiments and the various modifications that are suited to the particular use contemplated.

What is claimed is:

1. A hardware-based lock mechanism configured to support firmware security, comprising:
    a hardware-based lock unit associated with a resource, wherein the hardware-based lock unit is configured to maintain a locked state and a lock identification for the resource;
    an arbitrator configured to
        accept a request to access the resource by a first agent;
        create a first lock identification and set the locked state for the resource if the resource is in an unlocked state, indicating that the resource is locked;
        store the first lock identification and/or the lock state in the hardware-based lock unit;
        provide the first lock identification to the first agent to have an exclusive lock to access and control the resource;
        accept a second lock identification from a second agent requesting access to the same resource;
        grant access to the resource by the second agent if the resource is in the locked state by the first agent and the second lock identification provided by the second agent matches a third lock identification that is stored on the hardware-based lock unit;
        deny access by the second agent to the resource responsive to a mismatch between the second lock identification provided by the second agent and the third lock identification stored on the hardware-based lock unit.

2. The hardware-based lock mechanism of claim 1, wherein:
    the resource is a nonvolatile storage device configured to store and maintain a firmware image of an electronic device.

3. The hardware-based lock mechanism of claim 2, wherein:
one of the first and second agent is a hardware component executing on a processing core, wherein the hardware component is configured to access and verify the firmware image stored on the nonvolatile storage device.

4. The hardware-based lock mechanism of claim 2, wherein:
one of the first and second agent is a software component configured to make changes to, repair or update the firmware image stored on the nonvolatile storage device.

5. The hardware-based lock mechanism of claim 2, wherein:
the first agent is configured to update the firmware image stored on the nonvolatile storage device before releasing the exclusive lock.

6. The hardware-based lock mechanism of claim 2, wherein:
the first agent is configured to check a signature of the firmware image stored on the resource and transfer control to firmware image to reboot the electronic device if the signature is verified.

7. The hardware-based lock mechanism of claim 2, wherein:
the first agent is configured to release the exclusive lock so that another agent can lock the resource and update the firmware on the resource if there is no valid firmware image available on the resource under brick device scenario.

8. The hardware-based lock mechanism of claim 1, wherein:
the hardware-based locking mechanism provides a mutually exclusive locking scheme to the resource when more than one agent attempt to access the resource concurrently to prevent an attacker to launch a time of check (TOC)/time of use (TOU) attack by accessing the resource.

9. The hardware-based lock mechanism of claim 1, wherein:
the arbitrator is configured to set the locked state by setting a bit of the hardware lock unit associated with the resource.

10. The hardware-based lock mechanism of claim 1, wherein:
the arbitrator is configured to enable the first agent to lock the resource first before the second agent does under the hardware-based locking mechanism.

11. The hardware-based lock mechanism of claim 1, further comprising:
a resource controller configured to control access to the resource by the first and/or second agents/component based on a specified or identified slot and/or address of the resource.

12. The hardware-based lock mechanism of claim 11, wherein:
the resource controller is a Serial Peripheral Interface (SPI) controller.

13. The hardware-based lock mechanism of claim 1, wherein:
the first agent has full read and write access to the resource as a holder of an exclusive lock to the resource.

14. The hardware-based lock mechanism of claim 13, wherein:
the first agent is configured to change the lock identification and update the lock unit accordingly while in possession of the exclusive lock in order to allow or deny another agent from accessing the resource.

15. The hardware-based lock mechanism of claim 1, wherein:
the first agent is configured to release the exclusive lock on the resource and notify the arbitrator accordingly.

16. The hardware-based lock mechanism of claim 15, wherein:
the arbitrator is configured to clear the locked state of the hardware-based lock unit by resetting a corresponding bit of the hardware-based lock unit.

17. The hardware-based lock mechanism of claim 16, wherein:
the second agent is configured to wait until the first agent releases the exclusive lock on the resource and the locked state has been cleared before accessing the resource.

18. The hardware-based lock mechanism of claim 17, wherein:
the arbitrator is configured to create a new lock identification upon granting the second agent a new lock to access the resource while discarding the lock identification previously used by the first agent to lock the resource.

19. A method to support firmware security via a hardware-based lock mechanism, comprising:
accepting a request to access the resource by a first agent at an arbitrator;
creating a first lock identification and set a locked state for the resource if the resource is in an unlocked state, indicating that the resource is locked;
storing the first lock identification and/or the locked state in a hardware-based lock unit associated with the resource, wherein the hardware-based lock unit is configured to maintain the locked state and the lock identification for the resource;
providing the first lock identification to the first agent to have an exclusive lock to access and control the resource;
accepting a second lock identification from a second agent requesting access to the same resource at the arbitrator;
granting access to the resource by the second agent if the resource is in the locked state by the first agent and the second lock identification provided by the second agent matches a third lock identification that is stored on the hardware-based lock unit;
denying access by the second agent to the resource responsive to a mismatch between the second lock identification provided by the second agent and the third lock identification stored on the hardware-based lock unit.

20. The method of claim 19, wherein:
the resource is a nonvolatile storage device configured to store and maintain a firmware image of an electronic device.

21. The method of claim 20, further comprising:
updating the firmware image stored on the nonvolatile storage device before releasing the exclusive lock.

22. The method of claim 20, further comprising:
checking a signature of the firmware image stored on the resource and transferring control to firmware image to reboot the electronic device if the signature is verified.

23. The method of claim 20, further comprising:
releasing the exclusive lock so that another agent can lock the resource and update the firmware on the resource if there is no valid firmware image available on the resource under brick device scenario.

24. The method of claim 19, further comprising:
providing a mutually exclusive locking scheme to the resource when more than one agent attempt to access the resource concurrently to prevent an attacker to launch a time of check (TOC)/time of use (TOU) attack by accessing the resource.

25. The method of claim 19, further comprising:
setting the locked state by setting a bit of the hardware lock unit associated with the resource.

26. The method of claim 19, further comprising:
enabling the first agent to lock the resource first before the second agent does under the hardware-based locking mechanism.

27. The method of claim 19, further comprising:
controlling access to the resource by the first and/or second agents/component based on a specified or identified slot and/or address of the resource.

28. The method of claim 19, further comprising:
enabling the first agent to change the lock identification and update the lock unit accordingly while in possession of the exclusive lock in order to allow or deny another agent from accessing the resource.

29. The method of claim 19, further comprising:
releasing the exclusive lock on the resource and notify the arbitrator accordingly;
clearing the locked state of the hardware-based lock unit by resetting a corresponding bit of the hardware-based lock unit.

30. The method of claim 29, further comprising:
enabling the second agent to wait until the first agent releases the exclusive lock on the resource and the locked state has been cleared before accessing the resource;
creating a new lock identification upon granting the second agent a new lock to access the resource while discarding the lock identification previously used by the first agent to lock the resource.

* * * * *